(12) United States Patent  (10) Patent No.: US 8,555,341 B2
Ametsitsi  (45) Date of Patent: Oct. 8, 2013

(54) METHOD, APPARATUS, AND SYSTEM FOR NETWORK SECURITY VIA NETWORK WALL PLATE

(75) Inventor: Julius Ametsitsi, Marysville, WA (US)

(73) Assignee: Leviton Manufacturing Co., Inc., Little Neck, NY (US)

(*) Notice: Subject to any disclaimer, the term of this patent is extended or adjusted under 35 U.S.C. 154(b) by 1281 days.

(21) Appl. No.: 12/082,405

(22) Filed: Apr. 9, 2008

(65) Prior Publication Data

US 2010/0031032 A1 Feb. 4, 2010

Related U.S. Application Data

(60) Provisional application No. 60/910,761, filed on Apr. 9, 2007.

(51) Int. Cl.
  *H04L 29/06* (2006.01)
(52) U.S. Cl.
  USPC .................. 726/3; 713/151; 709/225
(58) Field of Classification Search
  None
  See application file for complete search history.

(56) References Cited

U.S. PATENT DOCUMENTS

| | | | | |
|---|---|---|---|---|
| 5,838,226 | A * | 11/1998 | Houggy et al. | 340/12.32 |
| 7,136,936 | B2 * | 11/2006 | Chan et al. | 709/250 |
| 7,535,861 | B2 * | 5/2009 | Buchholz et al. | 370/310 |
| 7,724,902 | B2 * | 5/2010 | Best et al. | 380/255 |
| 7,761,095 | B2 * | 7/2010 | Best et al. | 455/427 |
| 8,239,669 | B2 * | 8/2012 | Best et al. | 713/151 |
| 2005/0063420 | A1 | 3/2005 | Graves | |
| 2005/0210235 | A1 * | 9/2005 | Best et al. | 713/151 |
| 2005/0286900 | A1 | 12/2005 | Bentley et al. | |
| 2005/0289079 | A1 | 12/2005 | Krishan et al. | |
| 2006/0104224 | A1 | 5/2006 | Singh et al. | |
| 2006/0266540 | A1 | 11/2006 | Dinh | |
| 2007/0038866 | A1 * | 2/2007 | Bardsley et al. | 713/182 |

OTHER PUBLICATIONS

Saha, Arun; Molle, Mart. Thinking Outside the Box: Extending 802.1x Authentication to Remote "Splitter" Ports by Combining Physical and Data Link Layer Techniques. LCN '03 Proceedings. Pub. Date: 2003. Relevant pp. 324-333. Found on the World Wide Web at: http://ieeexplore.ieee.org/stamp/stamp.jsp?tp=&arnumber=1243158.*

Trusted Computing Group, Incorporated (Apr. 28, 2004) TCG Specification Architecture Overview; https://www.trustedcomputinggroup.org/downloads/TCG_1_0_Architecture_Overview.pdf, 54 pgs.

(Continued)

*Primary Examiner* — Nathan Flynn
*Assistant Examiner* — Jeremiah Avery
(74) *Attorney, Agent, or Firm* — Graybeal Jackson LLP

(57) ABSTRACT

A wall plate assembly has a first port adapted to be coupled to a device and a second port adapted to be coupled to a communications network. The wall plate assembly is operable to obtain authentication information from a user and to determine from the obtained authentication information whether the user should be granted or denied access to the network. The assembly is operable when the determination indicates the user should be granted access to provide endpoint location identification information associated with the wall plate assembly and the authentication information to the second port, and is operable responsive to a acknowledgement signal received via the second port to grant access to the network via the first port. The assembly is operable when either no acknowledgment signal is received or the determination indicates the user should be denied access to isolate the first port from the network.

28 Claims, 12 Drawing Sheets

(56) References Cited

OTHER PUBLICATIONS

National Security Agency, Fact Sheet NSA Suite B Cryptography, http://www.nsa.gov/ia/industry/crypto_suite_b.cfm?MenuID=10.2.7, 3 pgs.
Trusted Computing Group, Incorporated (May 21, 2007) TCG Credential Profiles, Specification Version 1.1, Revision 1.014, for TPM Family 1.2; Level 2; https://www.trustedcomputinggroup.org/specs/IWG/Credential_Profiles_V1_R1.14.pdf, 61 pgs.
Korean Intellectual Property Office (ISA/KR), International Search Report, International Application No. PCT/US2008/004636, dated Oct. 22, 2008.
Forescout Technologies, "Securing Visitor Access Through Network Access Control Technology," White Paper, 9 pgs, http:/www.forescout.com/whitepapers/securityvisitoraccess.html.
Forescout Technologies (2007), "CounterACT: Network Access. Controlled.™," White Paper, 11 pgs., http://www.forescout.com/whitepapers/naccounteract.html.
Skoudis, Ed; Poor, Mike (Nov. 2005); "On the Line," Information Security Magazine, TechTarget, http://searchSecurity.techtargetcom/magazineFeature/0,296894,sid14_gci1257037,00.html.
Forescout Technologies (2006), "Network Access Control (NAC): Planning a Successful Rollout and Implementation," White Paper, 17 pgs., http://www.forescout.com/whitepapers/naccounteract.html.
Davidson, Don, "Protecting Your Network With Ally and Tag-UR-IT," 10 pgs., http://www.arxceo.com/documents/Anti-reconarticlewithscreenshots.pdf.
Tipping Point (2007), "TippingPoint Intrusion Prevention System (IPS)," Datasheet, http://www.tippingpoint.com/pdf/resources/datasheets/400917-007_TippingPointIPS.pdf.
Top Layer (2003), "Secure Controller," Datasheet, 2 pgs., http://www.toplayer.com/pdf/secure_edge_datasheet.pdf.
Forescout Technologies (2008), "CounterACT: Network Access. Controlled," Datasheet, 4 pgs., http://www.forescout.com/downloads/datasheets/FS_CounterACT.pdf.
Forescout Technologies (2006), "ActiveScout: Signatureless Intrusion Prevention," Datasheet, 4 pgs., http://www.forescout.com/downloads/datasheets/FS_ActiveScoutpdf.
Arxceo Corporation (2005), "Ally iP100," Datasheet, 1 pg., http://www.arxceo.com/documents/ARXCEOAlly100PdShtGREEN.pdf.
ARXCEO Corporation (2005), "Ally iP1000," Datasheet, 1 pg., http://www.arxceo.com/documents/ARXCEOAlly1000PdShtGREEN.pdf.

* cited by examiner

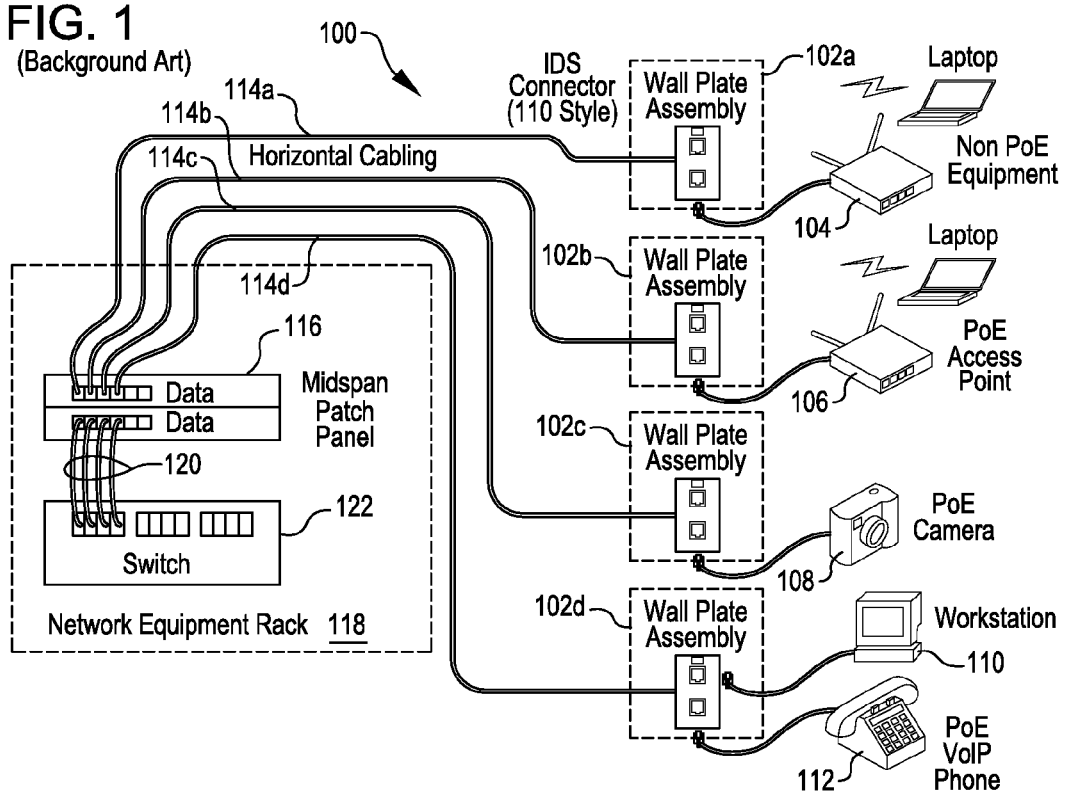
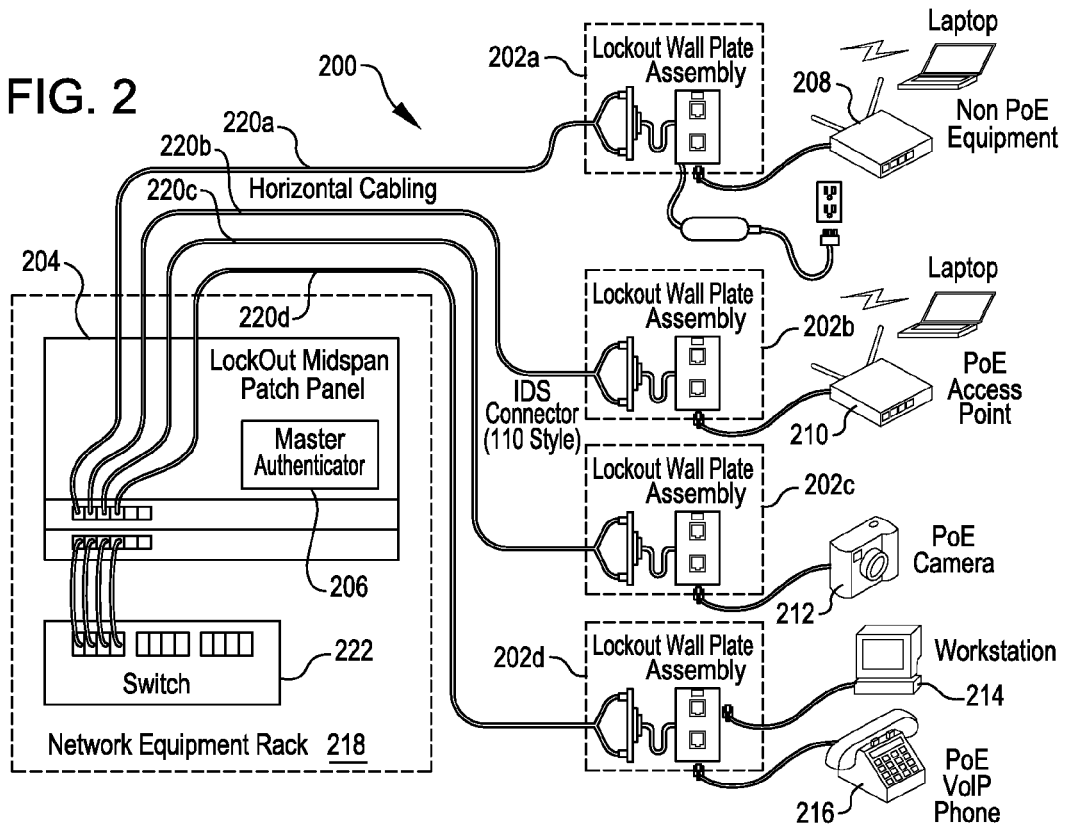

METHOD, APPARATUS, AND SYSTEM FOR NETWORK SECURITY VIA NETWORK WALL PLATE

PRIORITY CLAIM

This application claims the benefit of U.S. Provisional Patent Application No. 60/910,761, filed Apr. 9, 2007, which application is incorporated herein by reference in its entirety.

TECHNICAL FIELD

The present invention relates generally to communications networks, and more specifically to the security of such networks to prevent unauthorized parties from accessing the networks and to identifying the physical location of parties using the network at a given point in time.

BACKGROUND

FIG. 1 is a functional block diagram of a conventional communications network 100 including a number of wall plate assemblies 102a-d through which various devices are connected to the network, such as wireless routers 104, 106, a camera 108, a workstation 110, and a voice over internet protocol (VoIP) phone 112. Each of these devices 104-112 plugs into the corresponding wall plate assembly 102 to communicate over a corresponding horizontal cable 114a-d to a midspan patch panel 116 contained in a network equipment rack 118. The midspan patch panel 116 includes a number of ports, with each port being coupled to a corresponding horizontal cable 114 typically through an insulation displacement connector (IDC). The midspan patch panel 116 interconnects each port to which a horizontal cable 114 is coupled to an associated port which is typically a modular jack such as an RJ-45 jack. Patch cables 120 interconnect each port on the midspan patch panel 116 to a corresponding port of a network switch 122.

The network switch 122 functions to inspect data packets that are received from one of the devices 104-112 or an external device via the Internet or other external network coupled to the switch. The network switch 122 inspects each data packet to determine a source and destination address of each packet and to thereafter forward the packet to the desired destination address. The detailed operation of the network switch 122 and patch panel 116 will be understood by those skilled in the art and thus, for the sake of brevity, will not be described herein in detail. Also note that in the present description when referring generally to any one of a number of components (e.g, wall plate assemblies 102a-d) the letter designation may be omitted and only when referring to a specific one of the components (e.g, wall plate assembly 102a) will the letter designation be included.

In operation of the network 100, a device such as a laptop computer communicates data packets via to the wireless router 104 or 106 which, in turn, are communicated via the corresponding wall plate assembly 102a or 102b over the corresponding horizontal table 114a or 114b and through the midspan patch panel 116 to the network switch 122. Upon receipt of such a data packet, the network switch 122 determines a destination address contained in the data packet and thereafter routes the data packet to this destination address. For example, if the first laptop computer communicating with wireless router 104 is sending an email to the second laptop communicating with the wireless router 106, the network switch 122 would receive this packet from the first laptop computer and send it to the second laptop computer.

Conventional networks such as the network 100 are vulnerable to being accessed by unauthorized individuals. This is true because although only for wall plate assemblies 102a-d are shown in FIG. 1, a typical network such as a network in a large corporation will include hundreds or even thousands of such wall plate assemblies and multiple network equipment racks 118 contained, for example, in different buildings of the corporation. Moreover, many of these wall plate assemblies 102 may be in offices or even entire floors within a building that are at least temporarily unoccupied by employees of the corporation. Even though contained in unoccupied offices or floors, as the cost of ports on the patch panel 116 and network switch 122 has gotten relatively inexpensive, such wall plate assemblies 102 even in unoccupied areas remain active, meaning they remain connected to the associated patch panel 116 and network switch 122.

An unauthorized individual, upon gaining entry to one of the corporate buildings and gaining access to a wall plate assembly 102 in such an unoccupied office or floor, need merely connect a device such as a laptop computer to the wall plate assembly 102 to thereby gain access to the network. While there may be security measures in place on the network 100 such as authentication software to prevent such an unauthorized user from accessing network resources even though connected, a sophisticated unauthorized user can in a relatively short time defeat most such measures, thus leaving the network vulnerable.

Another need that arises in conventional communication networks such as the network 100 is the ability to identify the physical location from where a particular user is accessing the network. For example, an authorized user such as an employee having permissible access to the network 100 may have a VoIP phone 112 which that user may utilize in a variety of different locations other than his or her office. When in a meeting in a conference room, for instance, this user may step out of the meeting and to find a wall plate assembly 102 in which to plug in his or her VoIP phone and make a phone call. Such an employee could even do so while at home if remotely connected to the network 100. As a result, there is presently no way of knowing where the employee is physically located. In the event of an emergency, such as the employee suffering a heart attack or having some other medical emergency, emergency personnel responding to a call by the employee or to a call from another person to which the user was talking when the medical emergency arises have no way of knowing where the employee is physically located. These medical emergency personnel may show up at the employee's office while he is in another office in the building, or within another building entirely, or even at home.

SUMMARY

According to one aspect of the present invention, a wall plate assembly has a first port adapted to be coupled to a device and a second port adapted to be coupled to a communications network. The wall plate assembly is operable to obtain authentication information from a user and to determine from the obtained authentication information whether the user should be granted or denied access to the network. The assembly is operable when the determination indicates the user should be granted access to provide endpoint location identification information associated with the wall plate assembly and the authentication information to the second port, and is operable responsive to a acknowledgement signal received via the second port to grant access to the network via the first port. The assembly is operable when either no acknowledgment signal is received or the determination indicates the user should be denied access to isolate the first port from the network.

BRIEF DESCRIPTION OF THE DRAWINGS

FIG. 1 is a functional block diagram of a conventional computer network.

FIG. 2 is a functional block diagram of a computer network including lockout wall plate assemblies and a lockout midspan patch panel for providing network security and end point location identification according to one embodiment of the present invention.

DETAILED DESCRIPTION

Figure 3:
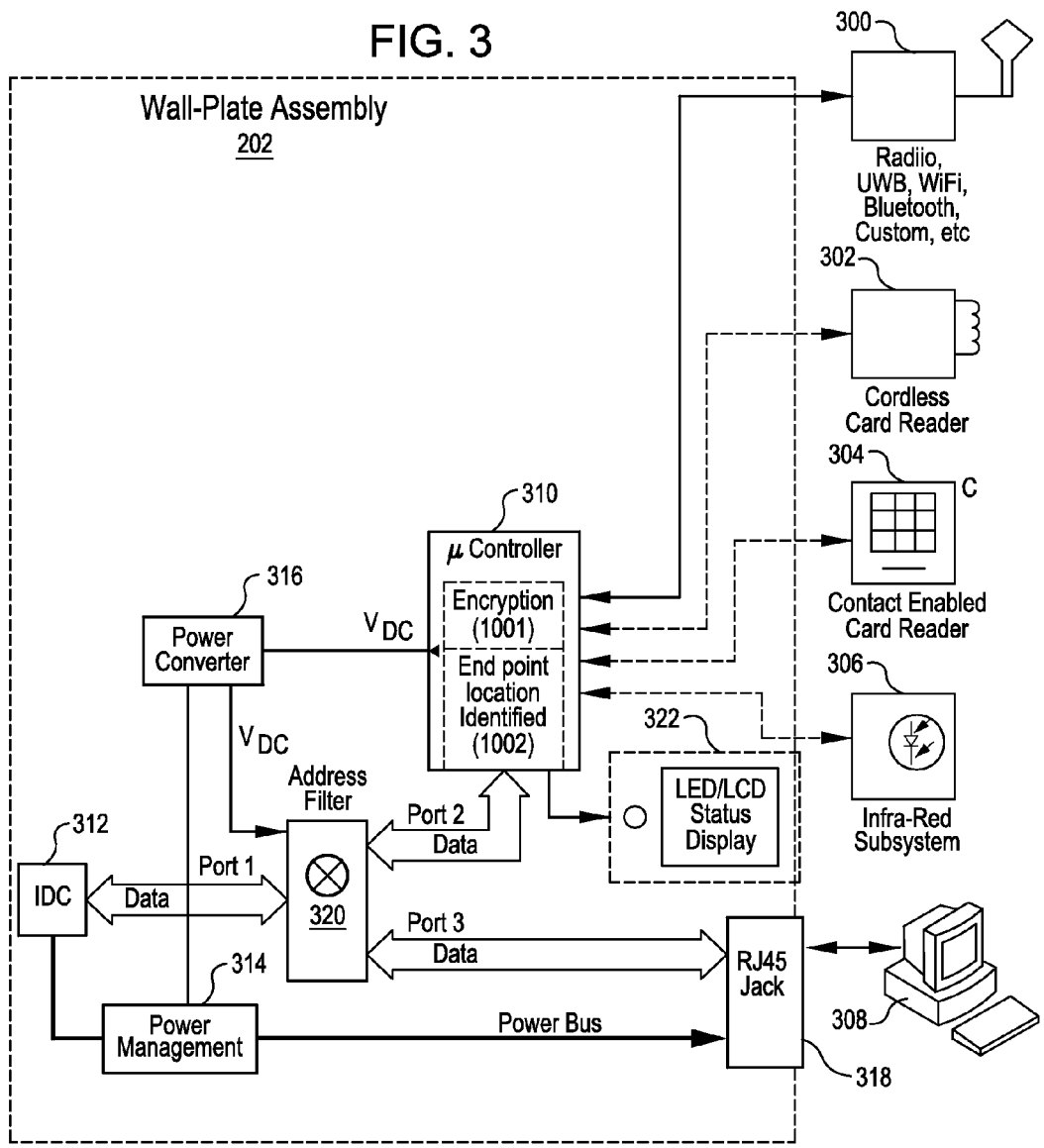
FIG. 3 is a functional block diagram of one of the wall plate assemblies of FIG. 2 according to one embodiment of the present invention.

FIG. 2 is a functional block diagram of a communications network 200 including lockout wall plate assemblies 202a-d and a lockout midspan patch panel 204 including a master authenticator 206 for providing network security and end point location identification according to one embodiment of the present invention. In operation, each wall plate assembly 202 operates in combination with the master authenticator 206 to perform authentication of a user that has or will connect a device to the wall plate assembly and also to provide endpoint location identification of the user, as will be described in more detail below. Endpoint location identification means the identification of the physical location of a user's device and thereby the user, as will also be described in more detail below.

In the following description, certain details are set forth regarding the described embodiments of the present invention to provide a sufficient understanding of the invention. One skilled in the art will appreciate, however, that the invention may be practiced without these particular details. Furthermore, one skilled in the art will appreciate that the example embodiments described herein do not limit the scope of the present invention, and will also understand that various modifications, equivalents, and combinations of the disclosed embodiments and components of such embodiments are within the scope of the present invention. Embodiments including fewer than all the components of any of the respective described embodiments may also be within the scope of the present invention although not expressly described in detail below. Finally, the detailed operations of well known components and/or processes have not been shown or described in detail to avoid unnecessarily obscuring the present invention.

The network 200 of FIG. 2 further includes a number of devices 208-216, each of which is connected to a corresponding one of the lockout wall plate assemblies 202a-d. A network equipment rack 218 houses the lockout midspan patch panel 204 which is coupled to the wall plate assemblies 202 via horizontal cables 220a-d. A network switch 222 is coupled to the patch panel 204 in the same way as previously described with regard to the conventional patch panel 116 of FIG. 1. Once any of the devices 208-216 is given access to the network 200, the operation of the device in communicating over the network and the functionality of the network switch 220 is similar to that previously described with reference to FIG. 1 and thus the detailed operation of these components in this situation will not again be described.

Before any of the devices 208-216 is given access to the network 200, however, a user of the device must be authenticated and the location of that user must be identified for endpoint location identification purposes. But describing the overall operation of the network 200 in authenticating if you consider and performing endpoint location identification, one of the lockout wall plate assemblies 202 will first be described in more detail with reference to FIG. 3. FIG. 3 is a functional block diagram of one of the wall plate assemblies 202 of FIG. 2 according to one embodiment of the present invention. As illustrated in FIG. 3, a number of authentication devices 300-306 and a computer system 308 are shown coupled to the wall plate assembly 202. The authentication devices 300-306 may take a variety of different forms, with the four shown in the embodiment of FIG. 3 merely serving as an example of several types of authentication devices that may be utilized. More specifically, the authentication device 302 is a contactless card reader which reads information off a smartcard (not shown) or other type of card possessed by a legitimate user of the network.

The device 304 is a contact enabled card reader in which such a legitimate user would insert a smartcard or other suitable card to thereby provide required authentication information. Similarly, the device 306 is an infrared subsystem and once again a legitimate user is assumed to have in his or her possession a device that would communicate through infrared signals with this device to provide the required authentication information. The device 300 is shown as merely a wireless communications device and represents any suitable type of authentication device that may be utilized, such as a biometric type authentication device. Also note that while for authentication devices 300-306 are shown in the example of FIG. 3, typically a single authentication device would be utilized for a given wall plate assembly 202.

A microcontroller 310 in the wall plate assembly 202 is coupled to the authentication devices 300-306 to receive authentication information from the devices and controls the overall operation of the wall plate assembly responsive to this received authentication information. The microcontroller 310 utilizes suitable encryption as indicated in the figure to prevent unauthorized users from obtaining information stored in the microcontroller that may enable such users to bypass the wall plate assembly 202 and thereby gain access to the network 200.

A horizontal cable (not shown in FIG. 3) is coupled to the wall plate assembly 202 through an IDC connector 312. In the example of FIG. 3, the horizontal cable is assumed to supply power to the wall plate assembly 202 such as where the horizontal cable is an Ethernet cable where "power over Ethernet" ("POE") is utilized. A power management unit 314 and power converter 316 receive electrical power over the associated horizontal cable via POE and provide power to components within the wall plate assembly 202. The power management unit 314 also supplies power through an RJ-45 jack to the user device connected to the wall plate assembly, which is the computer system 308 in this case.

The wall plate assembly 202 further includes an address filter 320 that operates in combination with the microcontroller 310 to perform several functions, namely: 1) to provide endpoint location identification information to the master authenticator 206 (FIG. 2); 2) to provide authentication information regarding a user attempting to access the network via the wall plate assembly to the master authenticator for verification; and 3) to prevent access to the network 200 by the computer system 308 (i.e, the user device connected to the wall plate assembly 202) until the user has been properly authenticated and the location of that user determined via the endpoint location identification information, as will now be described in more detail. The wall plate assembly 202 may further include a status indicator 322, which may be a light emitting diode (LED) or a liquid crystal display (LCD), coupled to the microcontroller 310 for use by the microcontroller in indicating the operational status of the wall plate assembly. For example, the status indicator 322 may be controlled by the microcontroller 310 to illuminate a red LED when the wall plate assembly 202 denies access to the network 210 to illuminate a green LED when the wall plate assembly grants such access.

In operation, to gain access to the communications network a user must first present authentication information to the corresponding wall plate assembly 202 through whatever type of authentication device 300-306 is being utilized. For the purposes of the present example, it is assumed that the authentication device being utilized is the contactless card reader 302. In this situation, the user presents a suitable card containing that user's authentication information and positions the card near the card reader 302 so that communication between the card and the card reader occurs to thereby transfer authentication information from the card to the card reader. One skilled in the art will understand the operation of such a card reader 302 and thus this operation will not be described in more detail.

Once the card reader 302 has obtained the authentication information from the user's card, the reader communicates that information to the microcontroller 310. The microcontroller 310 then processes the received authentication information to determine whether the user should be permitted or denied access to the network 200. This process may include decryption because the authentication information stored on the user's card may be encrypted to prevent unauthorized parties from gaining access to this information. At this point, while the microcontroller 310 is determining whether to grant or deny access to the user, the address filter 320 blocks any communication by the computer system 308 (or other device coupled to the jack 318) with the network 200.

If the microcontroller 310 determines that the user is not authorized, then the address filter 320 remains in the state blocking any communication by the computer system 308 with the network 200. The microcontroller 310 could, of course, perform other functions in this situation such as communicating this fact to the master authenticator 206 (FIG. 2) which, in turn, could notify a network administrator that access to the network was attempted and identify where this access was attempted and denied in the endpoint location identification information that could also be provided by the microcontroller 310 to the master authenticator in this situation. In processing the received authentication information to make this determination, the microcontroller 310 may store an encrypted table of authorized user information and may then decrypt the table along with the received authentication information and compare this decrypted information to that stored in the table to determine whether to grant or deny access.

When the microcontroller 310 processes the authentication information received from the device 302 and thereby authenticates the user, meaning that it has determined that the user should be granted access to the network 200, the microcontroller communicates this fact to the master authenticator 206 (FIG. 2) via port 2 and then via port 1 of the address filter 320. More specifically, the microcontroller 310 provides the received authentication information or information derived therefrom along with endpoint location identification information to the master authenticator. The master authenticator 206 utilizes this information to perform two functions. First, the master authenticator 206 also processes the received authentication information or information derived therefrom to confirm that the user should indeed be granted access to the network 200. Extra security is provided in this way for the network 200 since even if an unauthorized user is able to circumvent the wall plate assembly 202 presumably such a user could not also circumvent the master authenticator. This is true at least in part because the master authenticator 206 is contained in the network equipment rack 218, which is typically housed in a secure area and thus even if an unauthorized user gains access to a wall plate assembly 202 the user will not also have access to the master authenticator to try and attempt to also circumvent this device. If the master authenticator 206 makes a determination that the user should not be granted access to the network 200 and the operation stops here and the address filter 320 continuing to block communication by the computer system 308 and thereby denying access to the network. Once again, the master authenticator 206 could perform other functions in this situation such as communicating this fact to the master authenticator 206 (FIG. 2) which, in turn, could notify a network administrator that access to the network was attempted and identify where this access was attempted.

When the master authenticator 206 concurs with the wall plate assembly 202 and determines that the user should be granted access, the second function performed by the master authenticator is to utilize the endpoint location identification information received from the wall plate assembly to associate a physical location with the user. As previously mentioned, the endpoint location identification information is unique information stored in each wall plate assembly 202 that is utilized to identify the physical location of that wall plate assembly. The master authenticator 206 stores information corresponding to the physical location of each wall plate assembly 202 based upon the endpoint location identification information stored in each wall plate assembly. So for example, the master authenticator may store a table of endpoint location identifiers that contains an entry for each such identifier that indicates the physical location of the wall plate assembly 202 corresponding to each endpoint location identifier. In this way, the master authenticator 206 generates a list indicating the physical location of each user currently accessing the network 200. A network administrator, for example, could then access this list in an emergency situation or in some other situation where the location of the user was trying to be determined. In another embodiment, the master authenticator 206 could under certain conditions automatically supply this user location information to emergency personnel, such as where a user dialed 911 or other similar number presumably in some emergency situation.

At this point, once the master authenticator 206 has identified the location of the user and authenticated the user, the master authenticator sends and acknowledge packet back to the wall plate assembly 202 where this packet is routed via port 1 and then port 2 to the microcontroller 310. In response to the knowledge packet, the microcontroller controls the address filter so that the filter now couples port 2 to port 1 so that the computer system 308 may now communicate over the network 200.

In this way, the wall plate assemblies 202 and master authenticator 206 operating combination to secure the network 200 and thereby prevent, or at least greatly reduce the likelihood of unauthorized access to the network. Moreover, through the endpoint location identification information stored in each wall plate assembly 202 the physical location of each user of the network may be identified and utilized by network administrators, emergency personnel, or others depending on the environment in which the network 200 is contained and the other factors.

Figure 4:
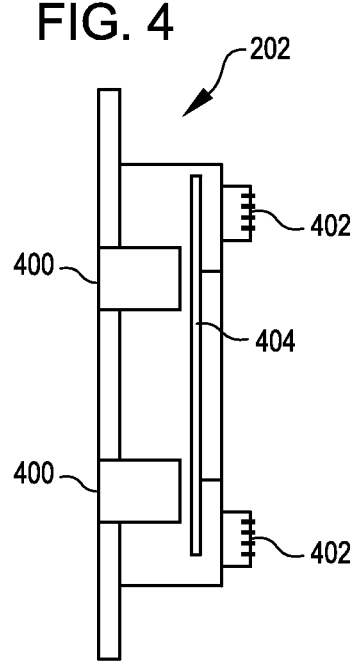
FIG. 4 is a cross-sectional side view of one of the wall plate assemblies of FIG. 2 according to one embodiment of the present invention.

FIG. 4 is a cross-sectional side view of one of the wall plate assemblies 202 of FIG. 2 according to one embodiment of the present invention. As illustrated in the figure, the RJ-45 jacks, IDC connectors 402, and a circuit board 404 containing the remaining components of the wall plate assembly illustrated in FIG. 3. This figure illustrates that all these components may be housed in a single unit which would then be mounted in a wall of an office or other room in the same way as conventional wall plates are mounted.

Figure 5:
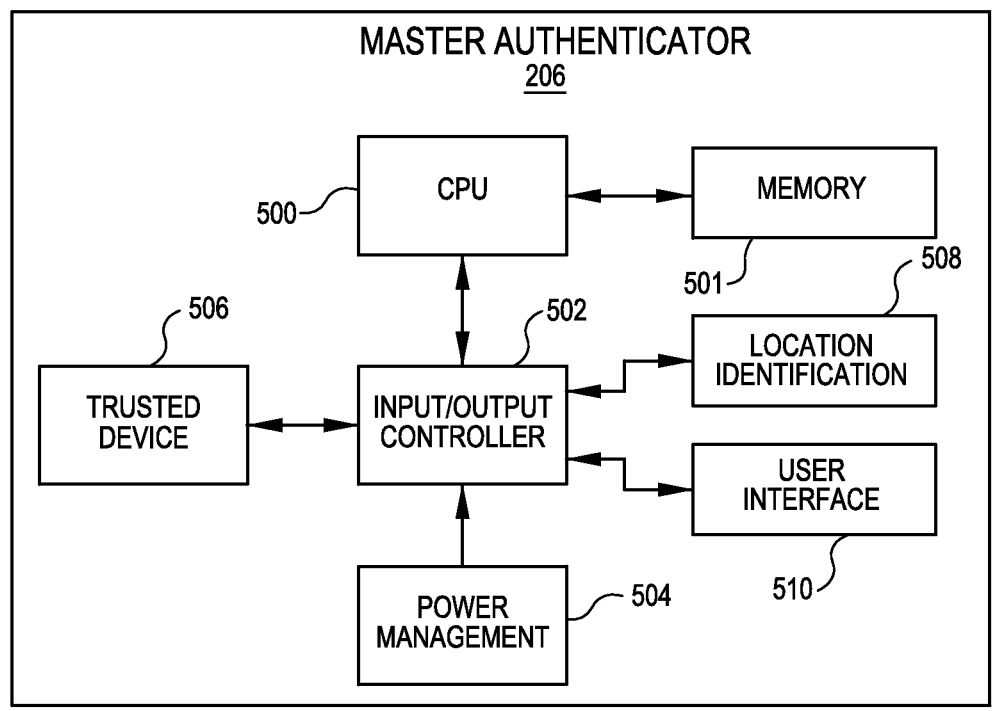
FIG. 5 is a functional block diagram illustrating in more detail the master authenticator FIG. 2 according to one embodiment of the present invention.

FIG. 5 is a functional block diagram illustrating in more detail the master authenticator 206 of FIG. 2 according to one embodiment of the present invention. In this sample embodiment, the master authenticator 206 includes a central processing unit 500 for controlling overall operation of the master authenticator and a memory 501 in which the central processing unit stores and retrieves data during such operation. The master authenticator 206 further includes an input/output controller 502 that controls communications with the wall plate assemblies 202 and other components within the network 200. A power management unit 504 controls the supplying of power to components in the master authenticator 206. A trusted device 506 component of the master authenticator 206 corresponds to some combination of hardware and software, or may just be software, which is highly secure and cannot be compromised. Sensitive information which cannot be compromised, such as user authentication information, would be stored in the trusted device component 506. The master authenticator 206 further includes a location identification component 508 which functions to determine the physical location of each user on the network 200 as previously discussed. A user interface 510 allows a user such as a network administrator to interface with and control the master authenticator 206. It would be through this user interface 510 that a network administrator would configure the network 200, including storing endpoint identification information in the wall plate assemblies 202 and configuring other aspects of the master authenticator 206 and wall plate assemblies.

Figure 6:
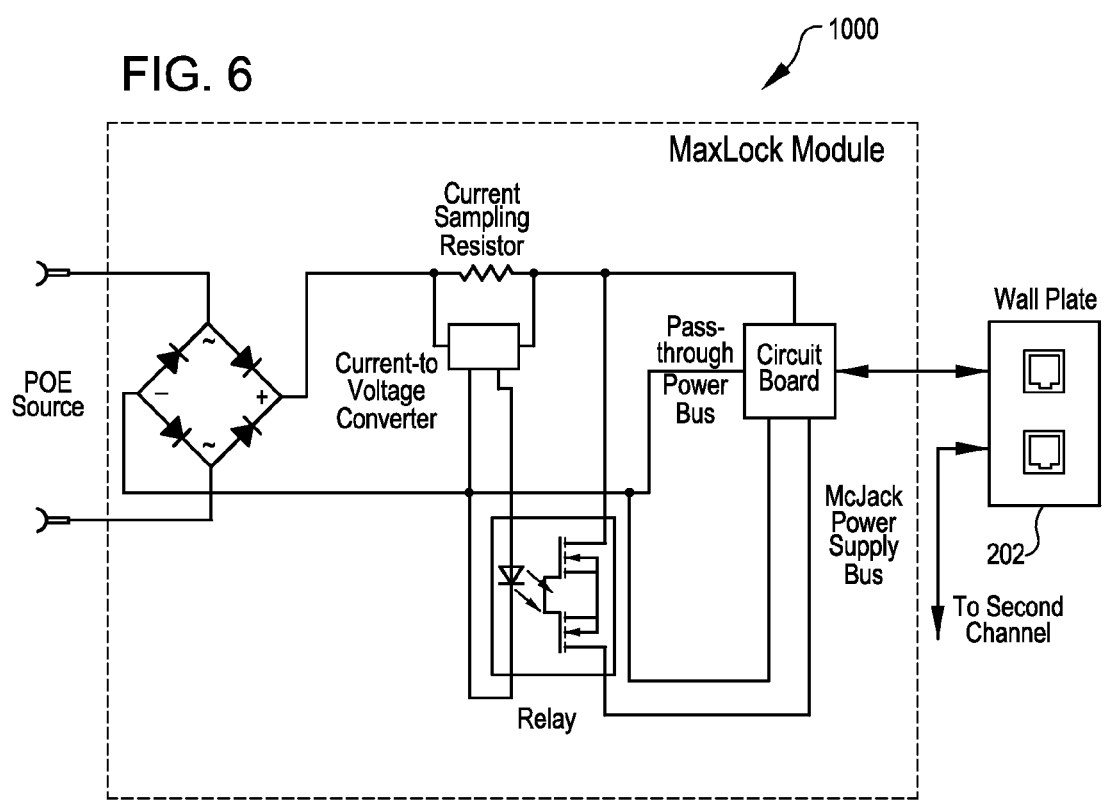
FIG. 6 is a functional block diagram of a power-up sequencing circuit for use in providing power to one of the lockout wall plate assemblies of FIG. 2 via a spare pair of a power over Ethernet cable conductors according to one embodiment of the present invention.

FIG. 6 is a functional block diagram of a power-up sequencing circuit 1000 for use in providing power to one of the lockout wall plate assemblies 202 of FIG. 2 via a spare pair of a power over Ethernet cable conductors according to one embodiment of the present invention.

Figure 7:
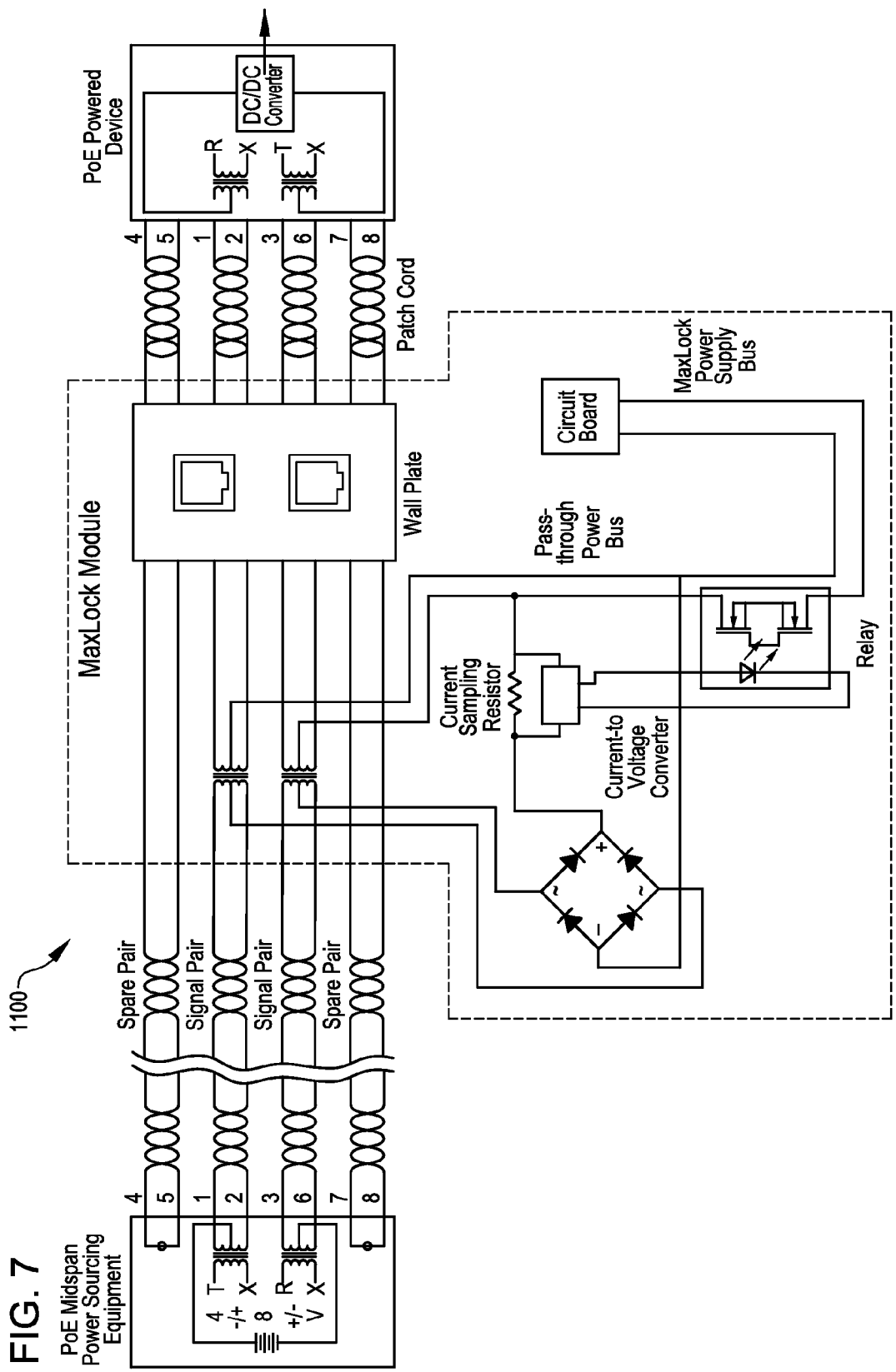
FIG. 7 is a functional block diagram of a power-up sequencing circuit for use in providing power to one of the lockout wall plate assemblies of FIG. 2 via a signal pair of a power over Ethernet cable conductors according to one embodiment of the present invention.
Figure 8:
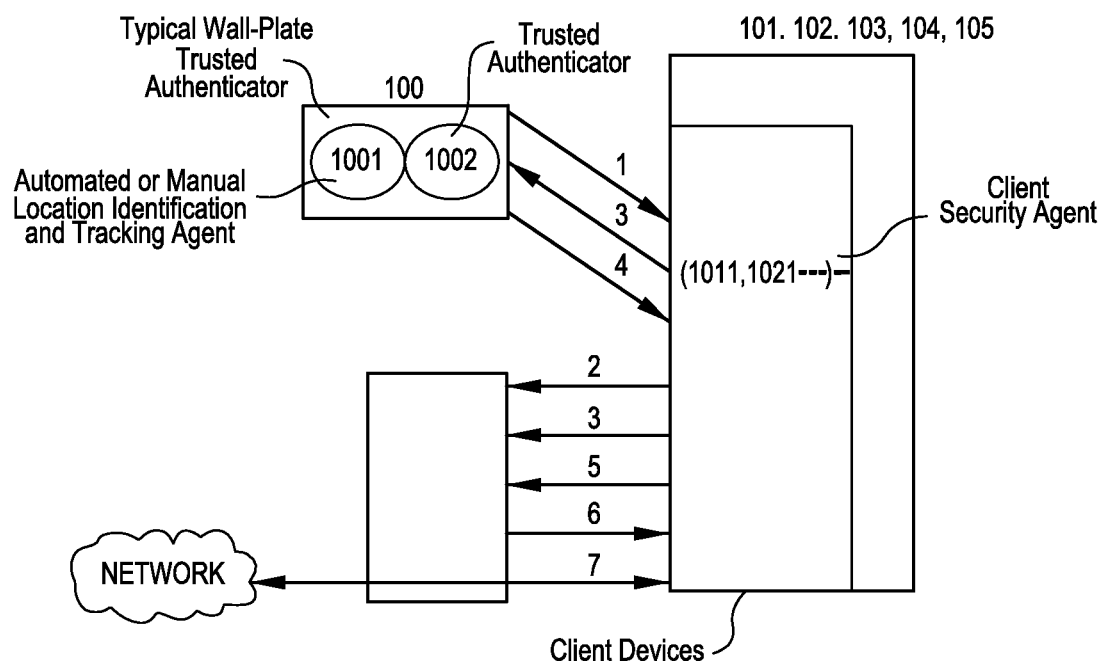
FIGS. 8-14 are functional block diagrams and flow diagrams illustrating various encryption and authentication processes that may be utilized in the network of FIG. 2 according to various embodiments of the present invention.
Figure 9:
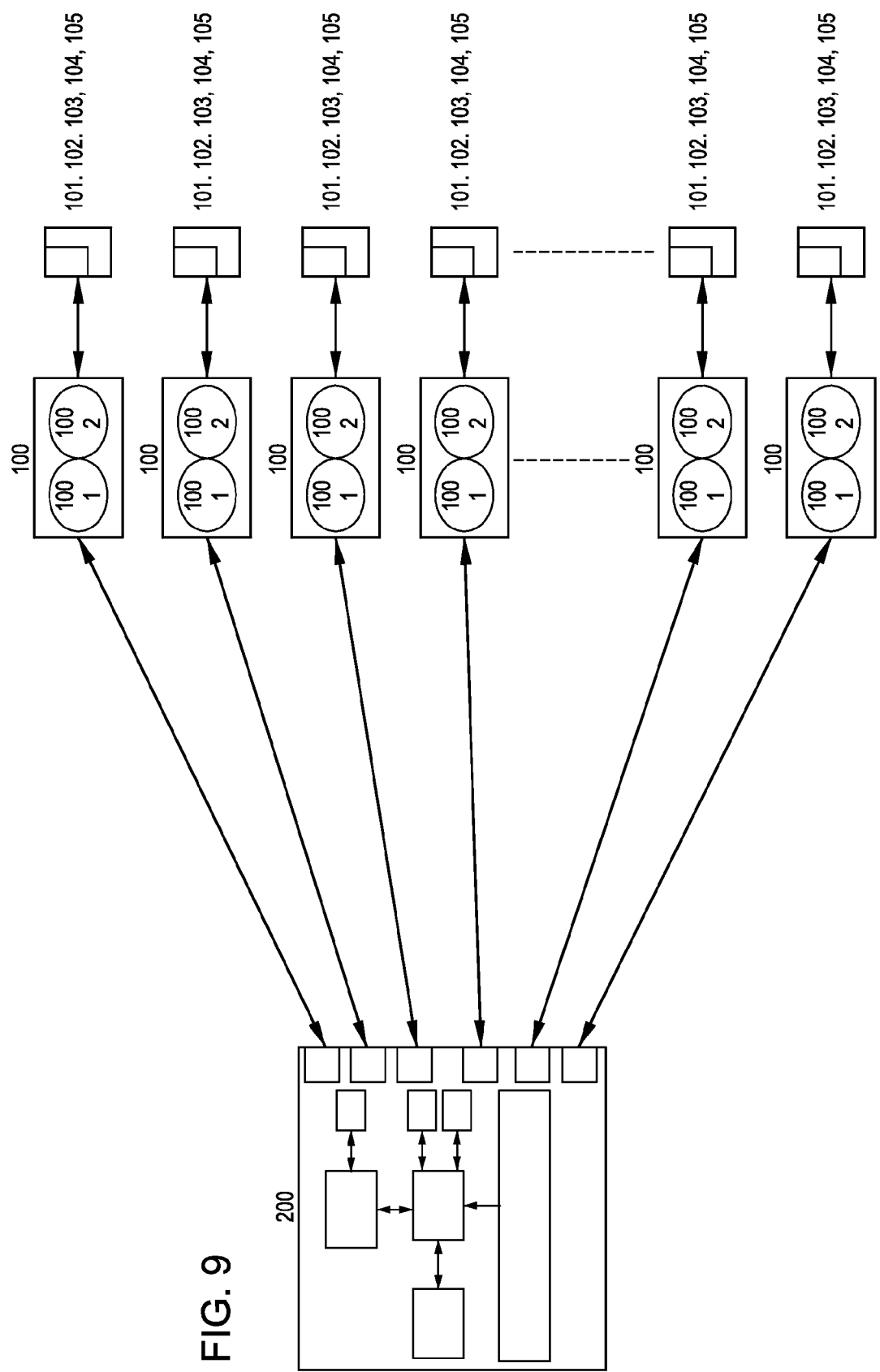
Figure 10:
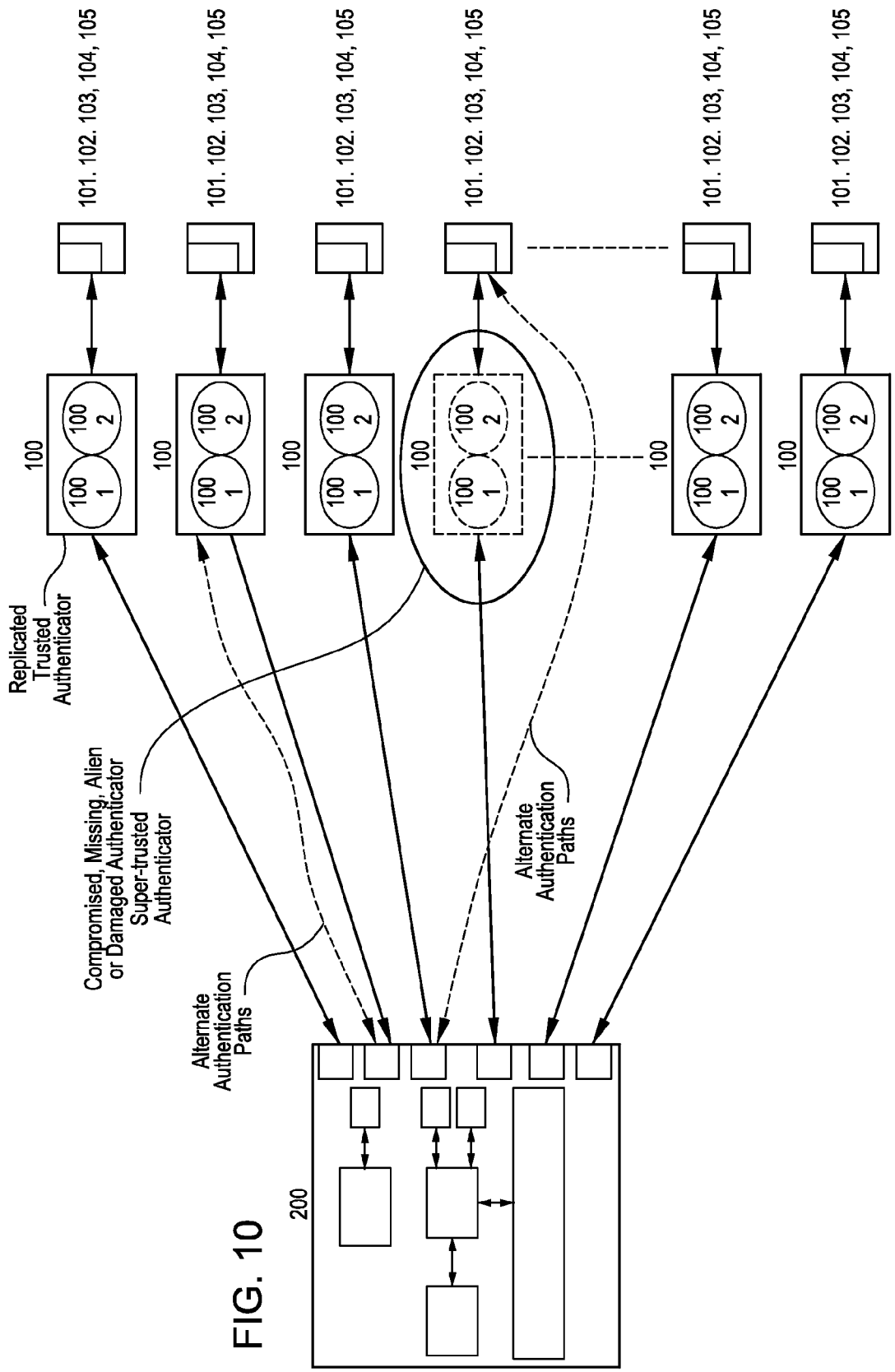
Figure 11:
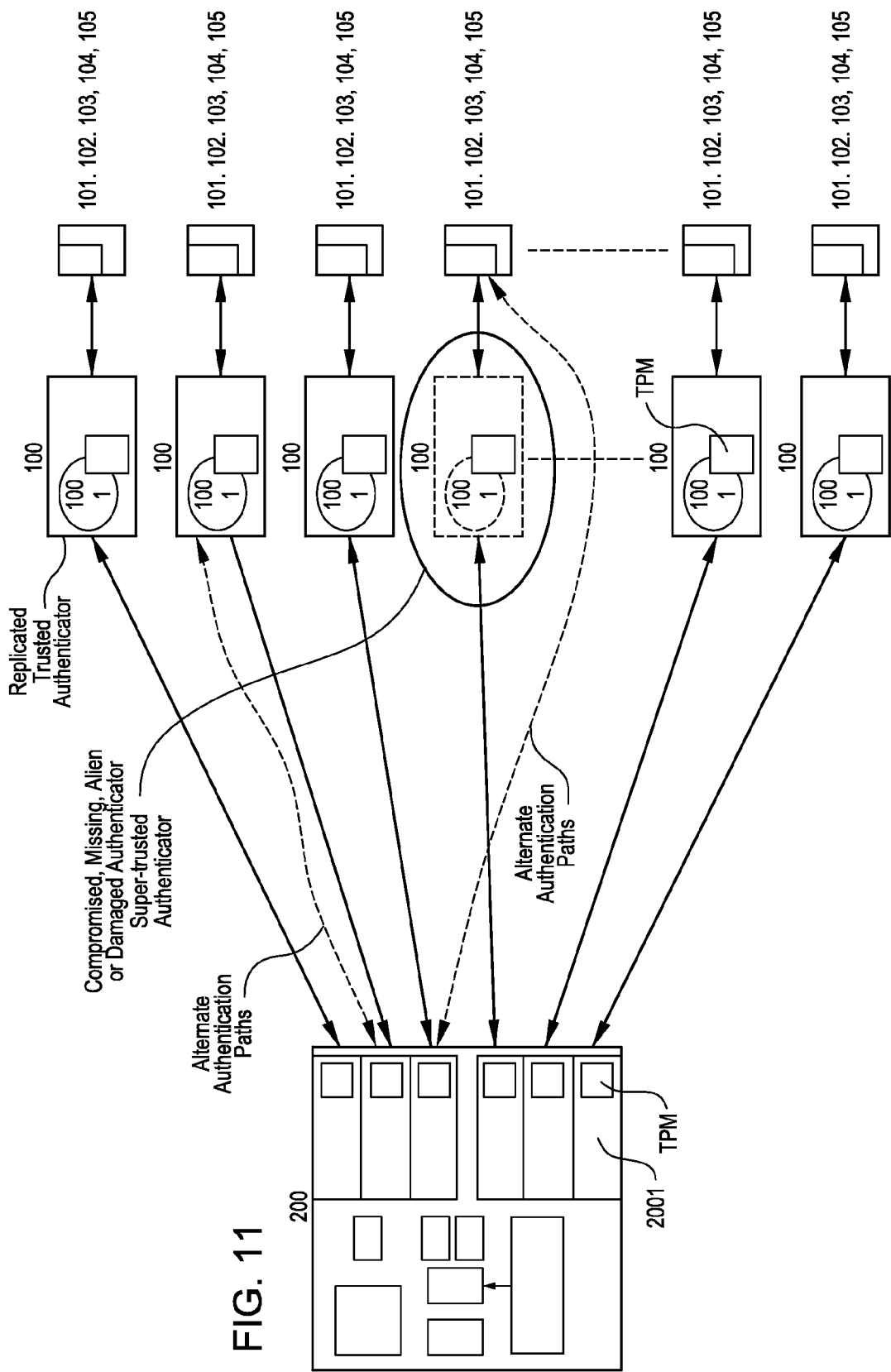
Figure 12:
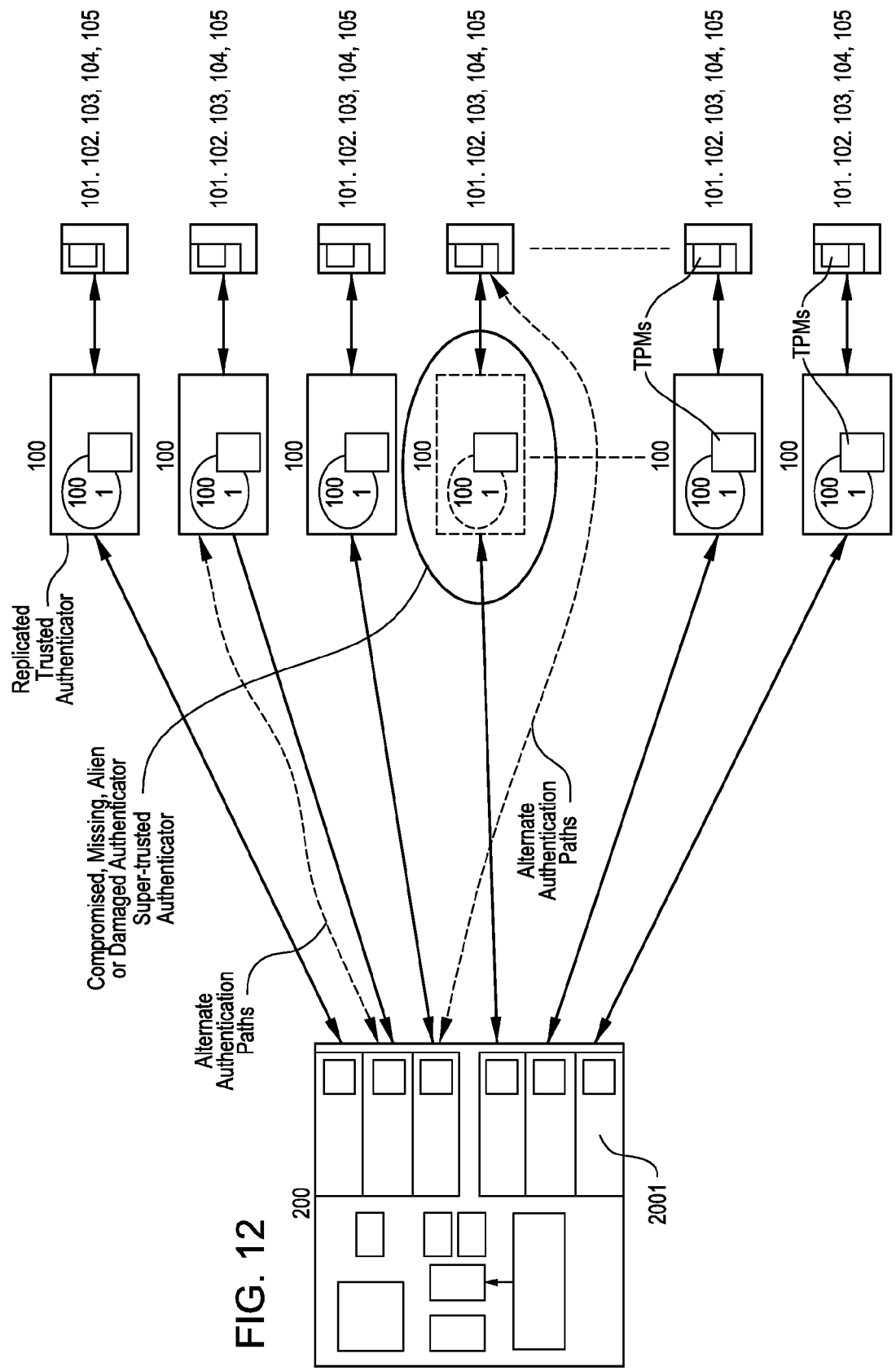
Figure 13:
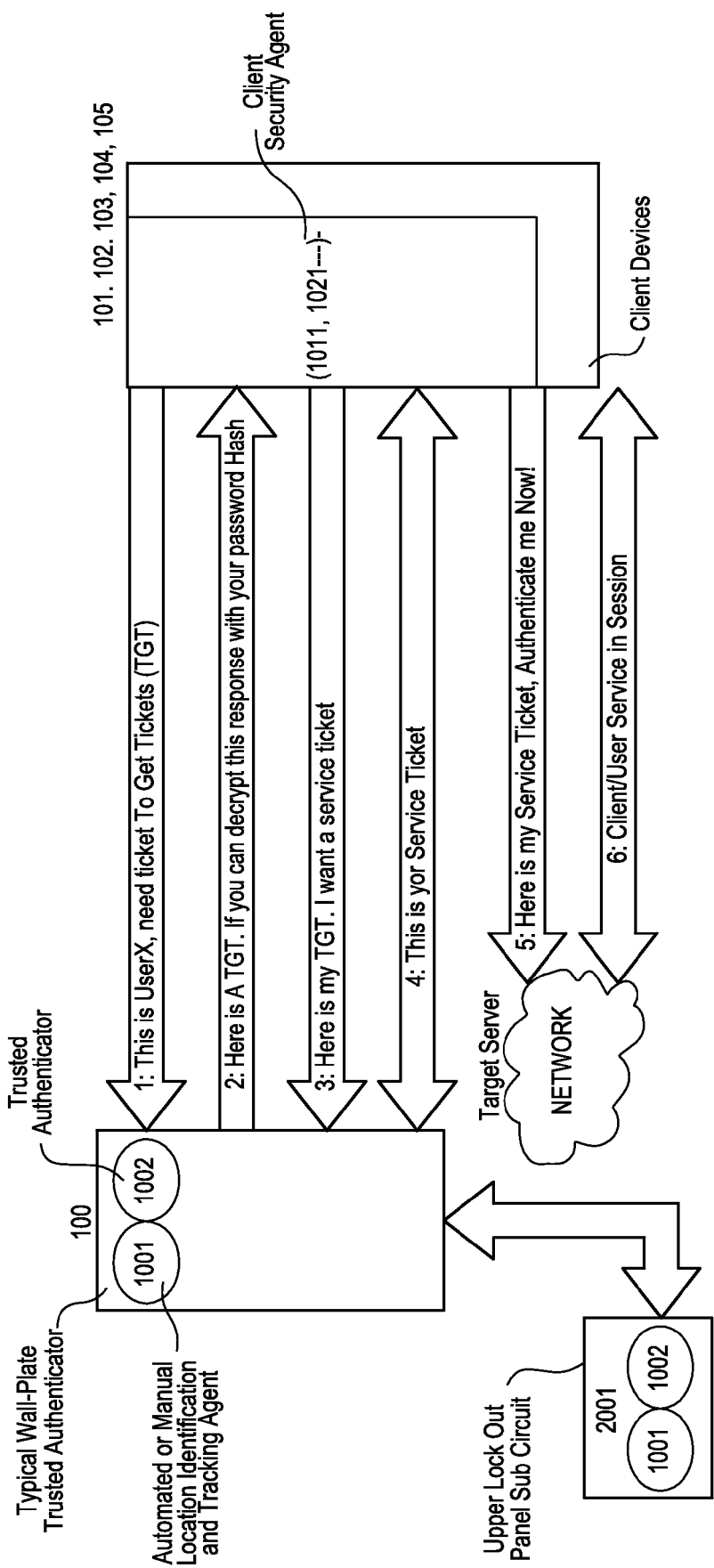
Figure 14:
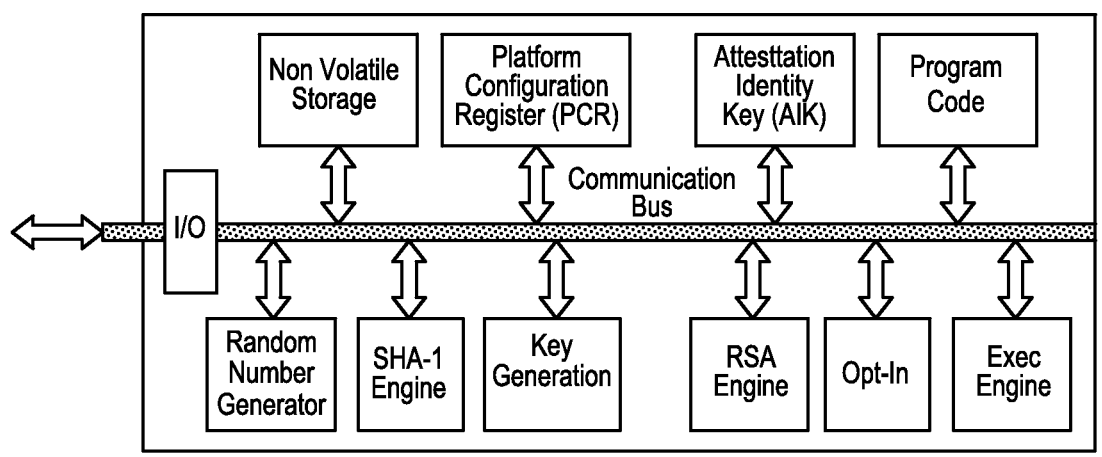

FIG. 7 is a functional block diagram of a power-up sequencing circuit 1100 for use in providing power to one of the lockout wall plate assemblies of FIG. 2 via a signal pair of a power over Ethernet cable conductors according to one embodiment of the present invention.

FIGS. 8-14 are functional block diagrams and flow diagrams illustrating various encryption and authentication processes that may be utilized in the network of FIG. 2 according to various embodiments of the present invention.

Even though various embodiments and advantages of the present invention have been set forth in the foregoing description, the above disclosure is illustrative only, and changes may be made in detail and yet remain within the broad principles of the present invention. For example, some of the components described above may be implemented using either digital or analog circuitry, or a combination of both, and also, where appropriate, may be realized through software executing on suitable processing circuitry. Moreover, the functions performed by various components in the described embodiments can be combined to be performed by fewer elements, separated and performed by more elements, or combined into different functional blocks, as will be appreciated by those skilled in the art. Finally, the inclusion of certain specific components within the described embodiments, such as the IDC connectors and RJ-45 jacks, is not meant to limit embodiments to such specific components, with one skilled in the art understanding that numerous other suitable components may be utilized in other embodiments of the present invention. Therefore, the present invention is to be limited only by the appended claims.

What is claimed is:

1. A wall plate assembly having a first port adapted to be coupled to a device and a second port adapted to be coupled to a communications network,
   the wall plate assembly operable to perform a first tier of authentication by obtaining authentication information from a user and determining from the obtained authentication information whether the user should be granted or denied access to the network,
   the wall plate assembly operable when the determination indicates the user should be granted access to perform a second tier of authentication by providing endpoint location identification information associated with the wall plate assembly and the authentication information to the second port, and operable, responsive to an acknowledgement signal received via the second port that confirms the user should be granted access, to grant access to the network via the first port, and
   the wall plate assembly further operable when either the acknowledgement signal indicates the user should not be granted access or the determination indicates the user should be denied access to isolate the first port from the network.

2. The wall plate assembly of claim 1 wherein the wall plate assembly is operable to obtain authentication information from a user via a wireless communications link.

3. The wall plate assembly of claim 1, further comprising:
   an address filter coupled between the first port and the second port, the address filter operable in a first mode to provide authentication information and endpoint location information to the second port and to isolate the first port from the second port, and operable in a second mode to receive an acknowledgement signal on the second port and to either couple the first port to the second port or continue isolating the first port from the second port; and
   a processor adapted to receive the authentication information and coupled to the address filter, the processor operable in the first mode to process the authentication information to determine whether to grant access to the network and thereafter operable, when the processor determines access should be granted, to provide the authentication information and endpoint location information to the address filter, and operable in the second mode to receive the acknowledgement signal from the address filter and when the acknowledgement signal indicates access to the network should be granted to couple the second port to the first port, and to control the address filter to continue isolating the first port from the second port when no acknowledgement signal is received or the acknowledgement signal indicates access should be denied.

4. The wall plate assembly of claim 3 wherein the processor stores encrypted authorization data in an encrypted table and decrypts the table along with the received authentication information and compares the decrypted received authentication information to that stored in the table to determine whether to grant or deny access during the first mode of operation.

5. The wall plate assembly of claim 4 wherein the wall plate assembly further comprises power components operable to receive power from the second port, the power components operable to provide a portion of this power to the processor and other components in the wall plate assembly and to provide a portion of this power to the first port.

6. The wall plate assembly of claim 1 wherein the first port comprises an RJ-45 jack and wherein the second port comprises an IDC connector.

7. The wall plate assembly of claim 3 wherein the processor comprises a microcontroller.

8. The wall plate assembly of claim 1 further comprising a status indicator coupled to the processor, the processor operable to control the status indicator to provide a visual indication of whether access to the network has been granted or denied.

9. A communications network, comprising:
an authentication device operable to receive authentication information;
a wall plate assembly coupled to the authentication device, the wall plate assembly having a first port adapted to be coupled to a user device and a second port, the wall plate assembly operable to execute a first stage of authentication by obtaining the authentication information from the authentication device and determining from the obtained authentication information whether a user associated with the authentication information should be granted or denied access to the communications network, and the wall plate assembly operable when the determination indicates the user should be granted access to execute a second stage of authentication by providing endpoint location identification information associated with the wall plate assembly and the authentication information to the second port, and operable, responsive to an acknowledgement signal received via the second port that confirms the user should be granted access, to grant access to the network via the first port, and the wall plate assembly further operable when either the acknowledgement signal indicates the user should not be granted access or the determination indicates the user should be denied access to isolate the first port from the network; and
a master authenticator component coupled to the second port of the wall plate assembly, the master authenticator component operable during the second stage of authentication to receive the authentication and endpoint location identification information from the wall plate assembly and operable to process the authentication information to determine whether the user should be granted access, and when this determination is positive to provide the acknowledgement signal indicating the user should be granted access to the wall plate assembly, and operable to utilize the endpoint location identification information to associate a physical location with the user corresponding to the authentication information.

10. The communications network of claim 9 wherein the master authenticator stores a table containing information indicating the physical location of each wall plate assembly based upon the endpoint location identification information stored in each wall plate assembly.

11. The communications network of claim 10 wherein the master authenticator is further operable to generate a list indicating the physical location of each user currently accessing the network.

12. The communications network of claim 9 further comprising a computer system coupled to the first port of the wall plate assembly.

13. The communications network of claim 9 wherein the authentication information received from the wall plate assembly is encrypted and wherein the processing of the received authentication information includes decrypting the authentication information.

14. The communications network of claim 9 wherein the authentication information received by the master authenticator is encrypted and the master authenticator operable to decrypt this information as part of processing the authentication information to determine whether the user should be granted access.

15. The communications network of claim 9 wherein the authentication device comprises a contactless card reader.

16. The communications network of claim 9 wherein the second port is coupled to the master authenticator through a horizontal cable.

17. The communications network of claim 9 further comprising a network equipment rack, the network equipment rack containing a lockout midspan patch panel including the master authenticator.

18. The communications network of claim 17 wherein the network equipment rack further comprises a network switch coupled to the lockout midspan patch panel.

19. A method of granting or denying a user access to a communication network including a wall plate assembly through which a device is connected to the network, the wall plate assembly being contained at a first physical location, the method comprising:
obtaining authentication information at the first physical location of the wall plate assembly;
performing a first level of authentication in the wall plate assembly by determining from the obtained authentication information whether the user should be granted or denied access to the network;
when the determination indicates the user should be granted access, performing a second level of authentication by,
communicating endpoint location identification information associated with the first physical location of the wall plate assembly and the authentication information to a second physical location; and
determining at the second physical location using the authentication information whether the user should be granted or denied access to the network;
when the first and second levels of authentication indicate the user should be granted access, granting the user access to the network and otherwise denying the user access to the network; and determining at the second physical location the first location of the wall plate assembly corresponding to the endpoint location identification information.

20. The method of claim 19 wherein a network equipment rack is present at the second physical location and includes a component to perform the operation of determining at the second physical location using the authentication information whether the user should be granted or denied access to the network.

21. The method of claim 19 wherein the obtained authentication information is encrypted.

22. The method of claim 19 wherein obtaining authentication information includes presenting, at the first physical location, a smart card containing the authentication information.

23. The method of claim 19 wherein further comprising storing in the wall plate assembly authentication information and endpoint location identification information.

24. The method of claim 19 wherein the endpoint location identification information and authentication information communicated to the second physical location are encrypted.

25. The method of claim 19 further comprising performing the recited operations for a plurality of wall plate assemblies.

26. The method of claim 19 wherein granting the user access to the network comprises coupling a user device to the network through the wall plate assembly.

27. The method of claim 26 wherein denying the user access to the network comprises isolating a user device from the network via the wall plate assembly.

28. The method of claim 19 wherein obtaining authentication information at the first physical location of the wall plate assembly comprises wirelessly communicating the authentication information to the wall plate assembly and receiving the wirelessly communicated authentication information with the wall plate assembly.

* * * * *